United States Patent
Li et al.

(10) Patent No.: US 10,970,603 B2
(45) Date of Patent: Apr. 6, 2021

(54) OBJECT RECOGNITION AND DESCRIPTION USING MULTIMODAL RECURRENT NEURAL NETWORK

(71) Applicant: INTERNATIONAL BUSINESS MACHINES CORPORATION, Armonk, NY (US)

(72) Inventors: Hongfei Li, Briarcliff Manor, NY (US); Jinfeng Yi, Nanjing (CN); Jing Xia, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 85 days.

(21) Appl. No.: 16/205,768

(22) Filed: Nov. 30, 2018

(65) Prior Publication Data
US 2020/0175344 A1 Jun. 4, 2020

(51) Int. Cl.
*G06K 9/62* (2006.01)
*G06N 3/08* (2006.01)

(52) U.S. Cl.
CPC .......... *G06K 9/6288* (2013.01); *G06N 3/08* (2013.01); *G06K 9/6256* (2013.01); *G06K 2209/27* (2013.01)

(58) Field of Classification Search
None
See application file for complete search history.

(56) References Cited

U.S. PATENT DOCUMENTS

| 10,515,295 B2* | 12/2019 | Liu | G06K 9/6828 |
| 2015/0161522 A1* | 6/2015 | Saon | G06N 3/0454 706/12 |
| 2017/0098153 A1 | 4/2017 | Mao | |
| 2017/0140240 A1 | 5/2017 | Socher | |
| 2017/0147910 A1 | 5/2017 | Mao | |

FOREIGN PATENT DOCUMENTS

CN 105740360 A 7/2016

OTHER PUBLICATIONS

Kjartansson et al., "Can you Judge a Book by its Cover?", Report Stanfor University, 2017, 8 pps., http://cs231n.stanford.edu/reports/2017/pdfs/814.pdf.

* cited by examiner

*Primary Examiner* — Vikkram Bali
(74) *Attorney, Agent, or Firm* — Samuel A. Waldbaum

(57) ABSTRACT

An embodiment of the invention may include a method, computer program product and computer system for image identification and classification. The method, computer program product and computer system may include a computing device which may receive one or more images of a first object from at least two angles linguistic data associated with the first object. The computing device may input the one or more images of the first object into one or more first neural networks and the linguistic data of the first object into one or more second neural networks. The computing device may combine the output of the one or more first neural networks and the one or more second neural networks and generate an identification model based on the combined output of the one or more first neural networks and the one or more second neural networks.

13 Claims, 6 Drawing Sheets

OBJECT RECOGNITION AND DESCRIPTION USING MULTIMODAL RECURRENT NEURAL NETWORK

BACKGROUND

The present invention relates generally to a method, system, and computer program for image identification and classification. More particularly, the present invention relates to a method, system, and computer program for utilizing neural networks to identify an unknown piece of art.

Artistic expression and innovation has been a driving force in the human existence for millennia resulting in a vast corpus of work spanning every civilization from cavemen and the ancient Egyptians to today. The study of this vast corpus of artistic work has led to the understanding of the human existence and how we have come to live today. New artistic objects from the past are still being discovered today and the process of identifying those objects is a vitally complex and important field. Today, art identification relies mostly on human inspection, especially when it comes to newly discovered and unknown objects. When it comes to current technology, systems exist for comparing photographs of an object to a database of known objects of art. For example, a user can take a photo of a painting and input that photo into a program or application and the application can identify that painting if it is one that exists in the database of that program or application.

BRIEF SUMMARY

An embodiment of the invention may include a method, computer program product and computer system for image identification and classification. The method, computer program product and computer system may include a computing device which may receive one or more images of a first object from at least two angles linguistic data associated with the first object. The computing device may input the one or more images of the first object into one or more first neural networks and the linguistic data of the first object into one or more second neural networks. The computing device may combine the output of the one or more first neural networks and the one or more second neural networks and generate an identification model based on the combined output of the one or more first neural networks and the one or more second neural networks.

BRIEF DESCRIPTION OF THE DRAWINGS

FIG. 1b illustrates example operating modules of the image identification and classification program of FIG. 1a;

DETAILED DESCRIPTION

Figure 1A:
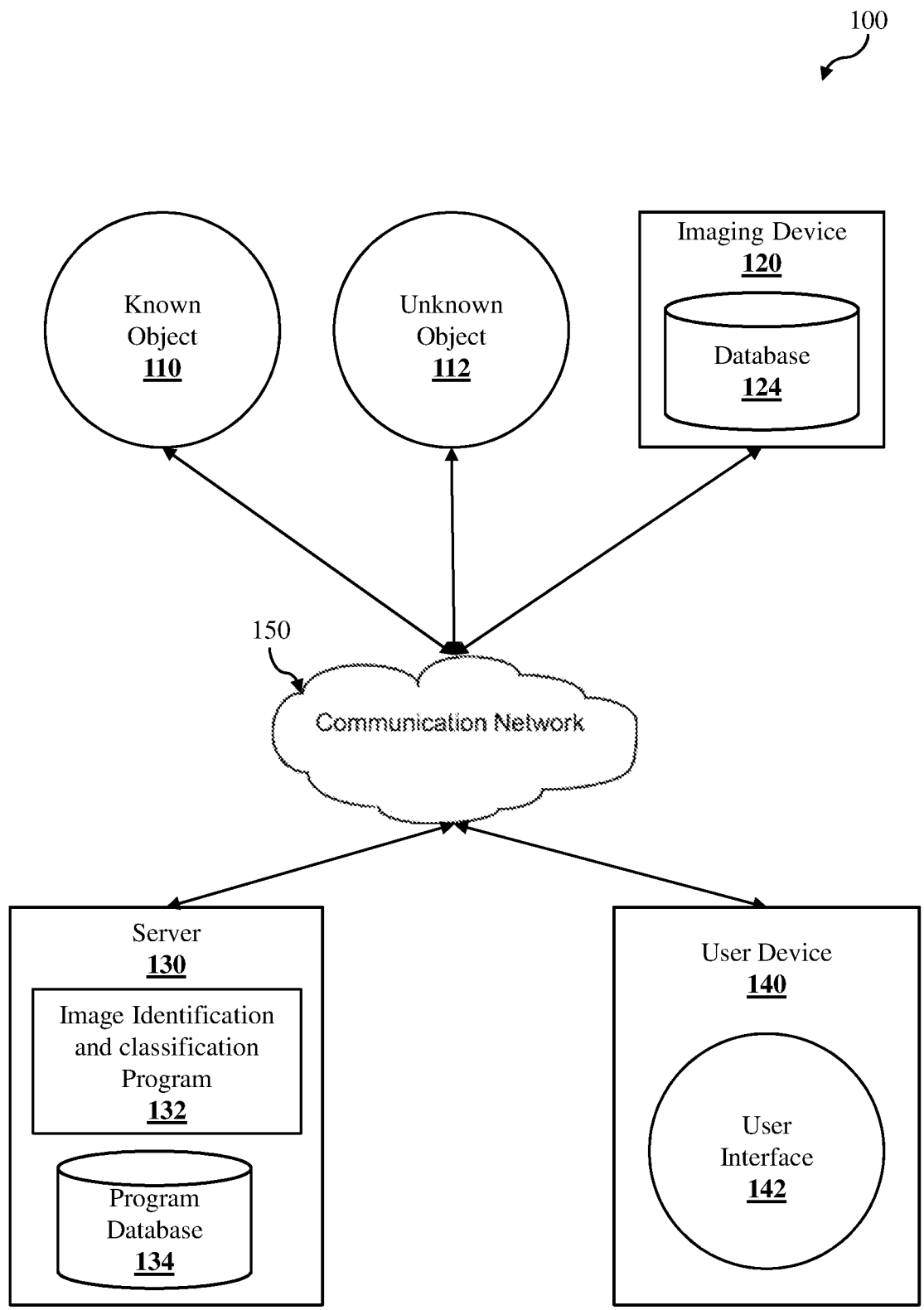
FIG. 1a illustrates a system for image identification and classification, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for creating and training an art identification model and identifying unknown artistic objects using that art identification model. Current technology does not allow for the identification of unknown artistic objects. Current technologies only allow for the comparison of a photo of a piece of art with a database of known art. For example, in current technology such as ArtBit or Google® Image Search, a user can enter an image of a piece of art and the program will compare that photograph to a database and try to identify a match. Thus, current technology provides no solution for identifying the artist, art medium, age, color, symbol, pattern, function, motif, and genre of an unknown piece of art. Embodiments of the present invention provide a means for identifying an unknown object, e.g. an artistic object, using neural networks to create and train an identification model. Further, embodiments of the present invention improves upon current known image search engines by identifying an unknown object and classifying the unknown object.

Reference will now be made in detail to the embodiments of the present invention, examples of which are illustrated in the accompanying drawings, wherein like reference numerals refer to like elements throughout. Embodiments of the invention are generally directed to a system for predicting the motivational predisposition of an individual.

FIG. 1 illustrates an image identification and classification system 100, in accordance with an embodiment of the invention. In an example embodiment, image identification and classification system 100 includes an object 110, an imaging device 120, a server 130, and a user device 140, interconnected via network 150.

In the example embodiment, the network 150 is the Internet, representing a worldwide collection of networks and gateways to support communications between devices connected to the Internet. The network 150 may include, for example, wired, wireless or fiber optic connections. In other embodiments, the network 150 may be implemented as an intranet, a local area network (LAN), or a wide area network (WAN). In general, the network 150 can be any combination of connections and protocols that will support communications between the object 110, the imaging device 120, the server 130, and the user device 140.

The known object 110 may be any known artistic object capable of being imaged and/or described. In the example embodiment, the object 110 may be, but is not limited to, a physical object or an image of an object. For example, the object 110 may be, but is it not limited to, a painting, a mural, graffiti, a drawing, a photograph, tapestry, stained glass, glassworks, metalworks, a sculpture, pottery, porcelain, ceramics, jewelry, clothing, furniture, architecture, or a writing etc. Further, the known object 110 may be any artistic object with known characteristics such as, but not limited to, artist, art medium, age, color, symbol, pattern, function, motif, and genre, etc. The known object 110 may be a known artistic object which is used by the image identification and classification program 132 to train an art identification model. While only a single known object 110 is illustrated, it can be appreciated at any number of known objects may be a part of the image identification and classification system 100.

The unknown object 112 may be any unknown artistic object capable of being imaged and/or described. In the example embodiment, the unknown object 112 may be, but is not limited to, a physical object or an image of an object. For example, the unknown object 112 may be, but is it not limited to, a painting, a mural, graffiti, a drawing, a photograph, tapestry, stained glass, glassworks, metalworks, a sculpture, pottery, porcelain, ceramics, jewelry, clothing, furniture, architecture, or a writing etc. Further, the unknown object 112 may be any artistic object with unknown characteristics such as, but not limited to, artist, art medium, age, color, symbol, pattern, function, motif, and genre, etc. The unknown object 112 may be an unknown artistic object which a user wants to identify using the image identification and classification program 132. While only a single unknown object 112 is illustrated, it can be appreciated at any number of unknown objects may be a part of the image identification and classification system 100.

The imaging device 120 may include the database 124. The imaging device 120 may be any device capable or capturing one or more images from one or more angles of the known object 110 and the unknown object 112. In the example embodiment, the imaging device 120 may be a camera, a scanner, a desktop computer, a notebook, a laptop computer, a tablet, a thin client, a cellphone, or any other device capable of capturing, storing, and/or compiling images of the known object 110 and the unknown object 112 and sending those images to and from other computing devices, such as the server 130 and the user device 140 via the network 150. The imaging device 120 is described in more detail with reference to FIG. 3.

The database 124 may store images of the known object 110 and the unknown object 112 captured by the imaging device 120. The database 124 may be any storage media capable of storing data capable of storing data, such as, but not limited to storage media resident in the imaging device 120 and/or removeable storage media. For example, the database 124 may be, but it not limited to, a hard drive, a solid stated drive, a USB drive, or a memory card, etc. The database 124 is described in more detail above and with reference to FIG. 3.

The server 130 may include the image identification and classification program 132 and the program database 134. In the example embodiment, the server 130 may be a desktop computer, a notebook, a laptop computer, a tablet computer, a thin client, or any other electronic device or computing system capable of storing compiling and organizing audio, visual, or textual content and receiving and sending that content to and from other computing devices, such as the imaging device 120 and the user device 140 via the network 150. In an example embodiment, the server 130 may be resident in the user device 140. In yet another embodiment, the server 130 may be separate from the user device 140 and may reside at a third-party location communicating with the user device 140 via the network 150. The server 130 is described in more detail with reference to FIG. 3.

The image identification and classification program 132 is a program capable of generating an identification model based on images and linguistic data of the known object 110, i.e. known artistic objects, input into a plurality of neural networks. For example, one or more images of the known object 110, such as, but not limited to, a porcelain vase may be captured using the imaging device 120. A linguistic description, i.e. linguistic data, of the porcelain vase may be entered using the user device 140 via the user interface 142. The linguistic data of the known object 110 may include, but is not limited to, the artist, the art medium, age, color, symbol, pattern, function, motif, and genre, etc. Further, the linguistic data may be data entered using an external input device on the user device 140, such as, but not limited to a keyboard or an image of linguistic data from the imaging device 120 and/or the user device 140. Linguistic data may also be present on the known object 110. The image identification and classification program 132 may input the one or more images of the known object 110 into one or more deep convolutional neural networks. The image identification and classification program 132 may input the linguistic data of the known object 110 into one or more deep recurrent neural networks. The image identification and classification program 132 may model the output of the one or more deep convolutional neural networks and the one or more deep recurrent neural networks into an art identification model. The art identification model models the probability distribution of generating a word given previous words and the one or more images. The image identification and classification program 132 repeats the above steps of inputting one or more images and linguistic data of other known artistic objects into the one or more deep convolutional neural networks and the one or more deep recurrent neural networks to train the art identification model. Further, the image identification and classification program 132 is capable of receiving one or more images of the unknown object 112, i.e. an unknown artistic object, and identifying the unknown object 112 using the generated identification model. The image identification and classification program 132 may receive one or more images of the unknown object 112 from the imaging device 120 and/or the user device 140 and input into the one or more images of the unknown object 112 into the identification model. The image identification and classification program 132 may generate a novel linguistic description of the unknown object 112. For example, the image identification and classification program 132 may receive one or more images of the unknown object 112, such as, but not limited to, an unknown porcelain vase and input the one or more images into the identification model. The image identification and classification program 132 may generate a novel linguistic description of the unknown porcelain vase based on the identification model such as "Ming Hongwu red underglaze porcelain ewer." The image identification and classification program 132 is described in more detail with reference to FIG. 1b.

The program database 134 may contain the art identification model generated by the image identification and classification program 132. The program database 134 may also store images of the known object 110 and the unknown object 112 received by the imaging device 120 and/or the user device 140. The program database 134 is described in more detail above and with reference to FIG. 3.

The user device 140 may include a user interface 142. In the example embodiment, the user device 140 may be a desktop computer, a notebook, a laptop computer, a tablet computer, a thin client, or any other electronic device or computing system capable of storing compiling and organizing audio, visual, or textual content and receiving and sending that content to and from other computing devices, such as the imaging device 120, and the server 130 via the network 150. While only a single user device 140 is depicted, it can be appreciated that any number of user devices may be part of the image identification and classification system 100. In some embodiments, the user device 140 includes a collection of devices or data sources. The user device 140 is described in more detail with reference to FIG. 3.

The user interface 142 includes components used to receive input from a user on the user device 140 and transmit the input to the image identification and classification program 132 residing on the server 130, or conversely to receive information from the image identification and classification program 132 and display the information to the user on the user device 140. In an example embodiment, the user interface 142 uses a combination of technologies and devices, such as device drivers, to provide a platform to enable users of the user device 140 to interact with the image identification and classification program 132. In the example embodiment, the user interface 142 receives input, such as but not limited to, textual, visual, or audio input received from a physical input device, such as but not limited to, a keypad, mouse, camera, and/or a microphone.

Figure 1B:
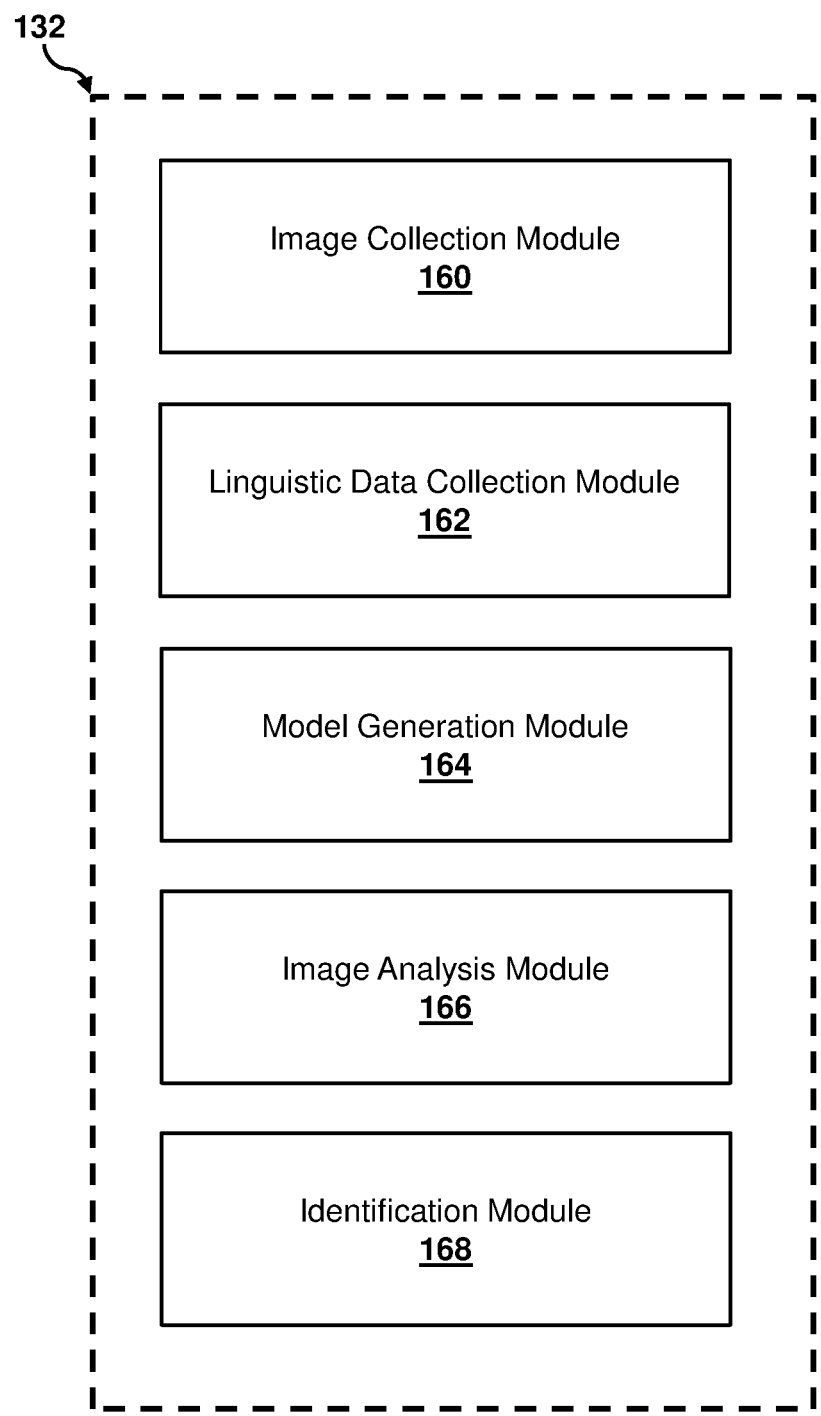

FIG. 1b illustrates example modules of the image identification and classification program 132. In an example embodiment, the image identification and classification program 132 may include five modules: image collection module 160, linguistic data collection module 162, model generation module 164, image analysis module 166, and identification module 168.

The image collection module 160 receives one or more images of the known object 110 and the unknown object 112 from the imaging device 120 and/or the user device 140. For example, the image collection module 160 may receive two photographs from two different angles of a porcelain vase from a camera, which may be a known artistic object or an unknown artistic object. The one or more images of the known object 110 and/or the unknown object 112 may be sent directly to the image identification and classification program 132 resident on the server 130 from the imaging device 120 via the network 150. In another embodiment of the invention, the images of the one or more images of the known object 110 and/or the unknown object 112 may be sent from the imaging device 120 to user device 140 and then to the image identification and classification program 132 via the network 150. The one or more images of the known object 110 and/or the unknown object 112 may be from one or more angles of the known object 110 and/or the unknown object 112. In one embodiment of the invention, the image collection module 160 may receive one or more images of the known object 110, i.e. one or more known artistic objects. In another embodiment of the invention the image collection module 160 may receive one or more images of the unknown object 112, i.e. one or more unknown artistic objects. The image collection module 160 may store the one or more images of the known object 110 and/or the unknown object 112 in the program database 134.

The linguistic data collection module 162 receives linguistic data of the known object 110 from the imaging device 120 and/or the user device 140. The linguistic data collection module 162 may receive linguistic data describing the known object 110, from the user device 140 and/or the imaging device 120. For example, the linguistic data collection module 162 may receive the written description "Qing Yongzheng enameled porcelain bowl" for the known object 110 from the user device 140. In another embodiment, the unknown object 112 may contain linguistic data physically present on the unknown object 112 and the linguistic data collection module 162 may receive linguistic data that is present on the unknown object 112.

The model generation module 164 generates an identification model based on the received one or more images and linguistic data of one or more of the known object 110. The model generation module 164 may generate and train the identification model using a plurality of neural networks, including, but not limited to, deep convolutional neural networks, and deep recurrent neural networks. Deep convolutional neural networks are a class of deep, feed-forward artificial neural networks consisting of an input layer, an output layer, and multiple hidden layers used to analyze images. Deep recurrent neural networks are artificial neural networks wherein the connections between the nodes of the network form a directed graph along a sequence used for analyzing linguistic data. The model generation module 164 may input the received one or more images of the known object 110, i.e. the known artistic objects, into one or more deep convolutional networks. The model generation module 164 may input the received linguistic data of the known object 110, i.e the known artistic objects, into one or more deep recurrent neural networks. The model generation module 164 combines the output of the one or more deep convolutional networks and the one or more deep recurrent neural networks into an identification model. The identification model models the probability distribution of generating a word given the linguistic data and the one or more images of the known artistic objects.

The image analysis module 166 receives one or more images of the unknown object 112, i.e. an unknown artistic object, from the imaging device 120 and/or the user device 140. The image analysis module 166 inputs the one or more images of the unknown object 112, into the generated identification model. For example, the image analysis module 166 may receive two images of an unknown painting and input those images into the generated identification model.

The identification module 168 receives the output of the identification model for the unknown object 112 and generates linguistic data identifying the unknown object 112. For example, if two images of an unknown painting are input into the identification model by the image analysis module 166, the identification module receives the output of the identification model and generates a linguistic description of the unknown painting. The linguistic description may include one or more pieces of the linguistic data including, but not limited to, the artist, the art medium, age, color, symbol, pattern, function, motif, and genre, etc. Thus, the linguistic description of the unknown painting may be for example "Edward Hopper, Nighthawks, 1942, American Realism, Oil," or the linguistic description may contain less description such as, "American Realism, Oil." Further, the identification module 168 may display the linguistic description to a user. The identification module 168 may display for example, but not limited to, a notification to a user on the user interface 142.

Figure 2:
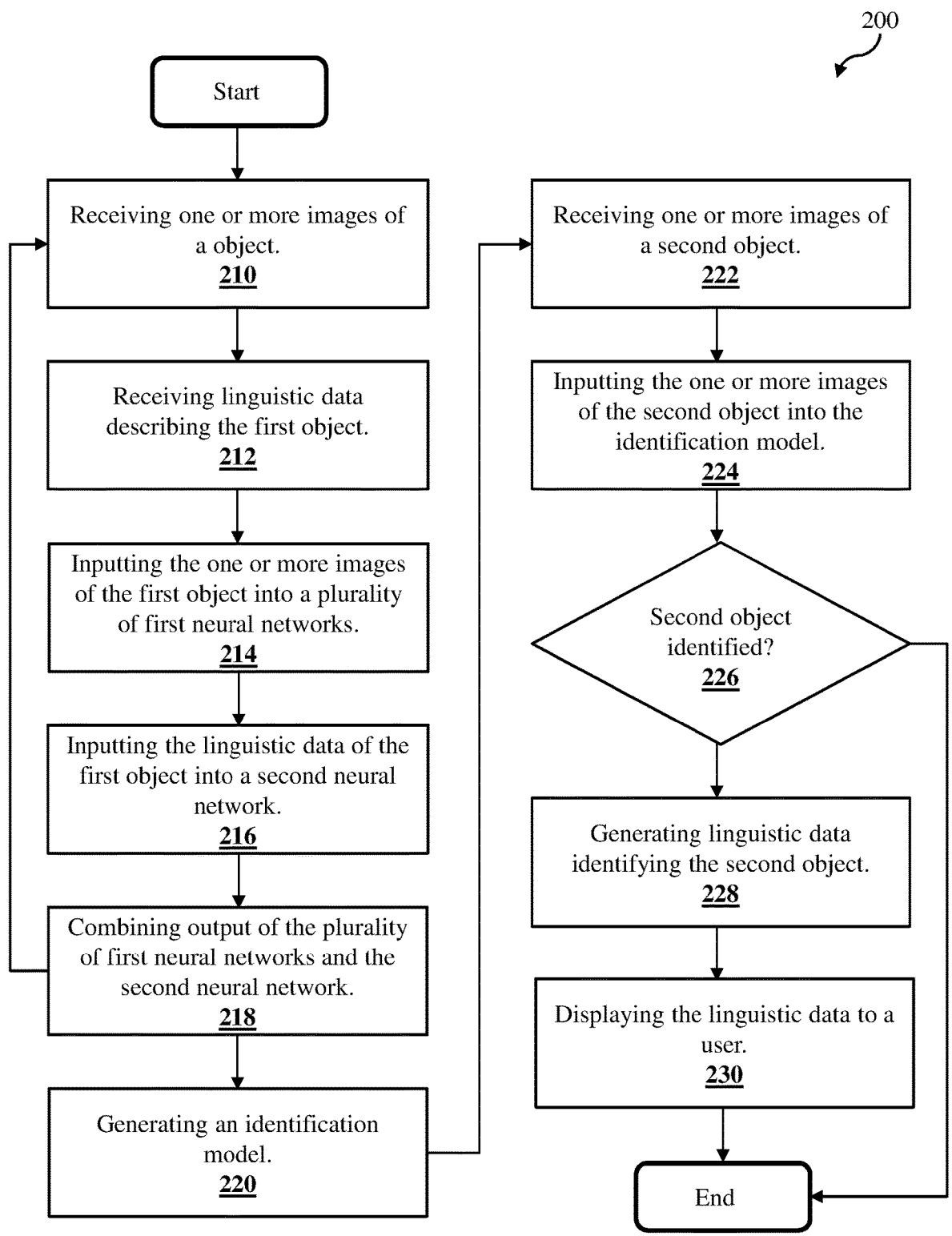
FIG. 2 is a flowchart illustrating an example method of image identification and classification in accordance with an embodiment of the invention.

Referring to FIG. 2, a method 200 for art identification is depicted, in accordance with an embodiment of the present invention.

Referring to operation 210, the image collection module 160 receives one or more images of one or more of the known object 110 from the imaging device 120 and/or the user device 140. Image collection is described in more detail above with reference to the image collection module 160.

Referring to operation 212, the linguistic data collection module 162 receives linguistic data of the known object 110 from the imaging device 120 and/or the user device 140. Linguistic data collection is described in more detail above with reference to the linguistic data collection module 162.

Referring to operation 214, the model generation module 164 inputs the received one or more images of one or more of the known object 110, i.e. the known artistic objects, into one or more deep convolutional networks. Input of images of the known object 110 into one or more deep convolutional networks is described in more detail above with reference to the model generation module 164.

Referring to operation 216, the model generation module 164 may input the received linguistic data of one or more of the known object 110, i.e. the known artistic objects, into one or more deep recurrent neural networks. Input of linguistic data into one or more deep recurrent neural networks is described in more detail above with reference to the model generation module 164.

Referring to operation 218, the model generation module 164 combines the output of the one or more deep convolutional networks and the one or more deep recurrent neural networks. Neural network output combination is described in more detail above with reference to the model generation module 164.

Operations 210-218 may be repeated for any number of the known object 110, i.e. known artistic objects. Preferably, operations 210-218 are repeated for a large number of known artistic objects. In an embodiment, the learning process can be performed on parallel computer processing units (CPUs), which improves over learning severally.

Referring to operation 220, the model generation module 164 generates an identification model based on the combined output of the one or more deep convolutional networks and the one or more deep recurrent neural networks. Model generation is described in more detail above with reference to the model generation module 164.

Referring to operation 222, the image collection module 160 receives one or more images of the unknown object 112 from the imaging device 120 and/or the user device 140. Image collection is described in more detail above with reference to the image collection module 160.

Referring to operation 224, the model generation module 164 inputs the received one or more images of the unknown object 112, i.e. an unknown artistic object, which may be referred to as a "second" object, into one or more deep convolutional networks. Input of images of the unknown object 112 into one or more deep convolutional networks is described in more detail above with reference to the model generation module 164.

Referring to operation 226, the image identification and classification program 132 determines if the identification model identified the unknown object 112. If the identification module 168 is unable to identify the unknown object 112, the operation ends. If the identification module 168 is able to identify the unknown object 112, the identification module 168 generates linguistic data identifying the unknown object 112 at operation 228. Further, the linguistic data may be provided to a search engine and used to supplement an index of images. Unknown artistic data is described in more detail above with reference to the identification module 168.

Referring to operation 230, the identification module displays the linguistic description to a user.

Figure 3:
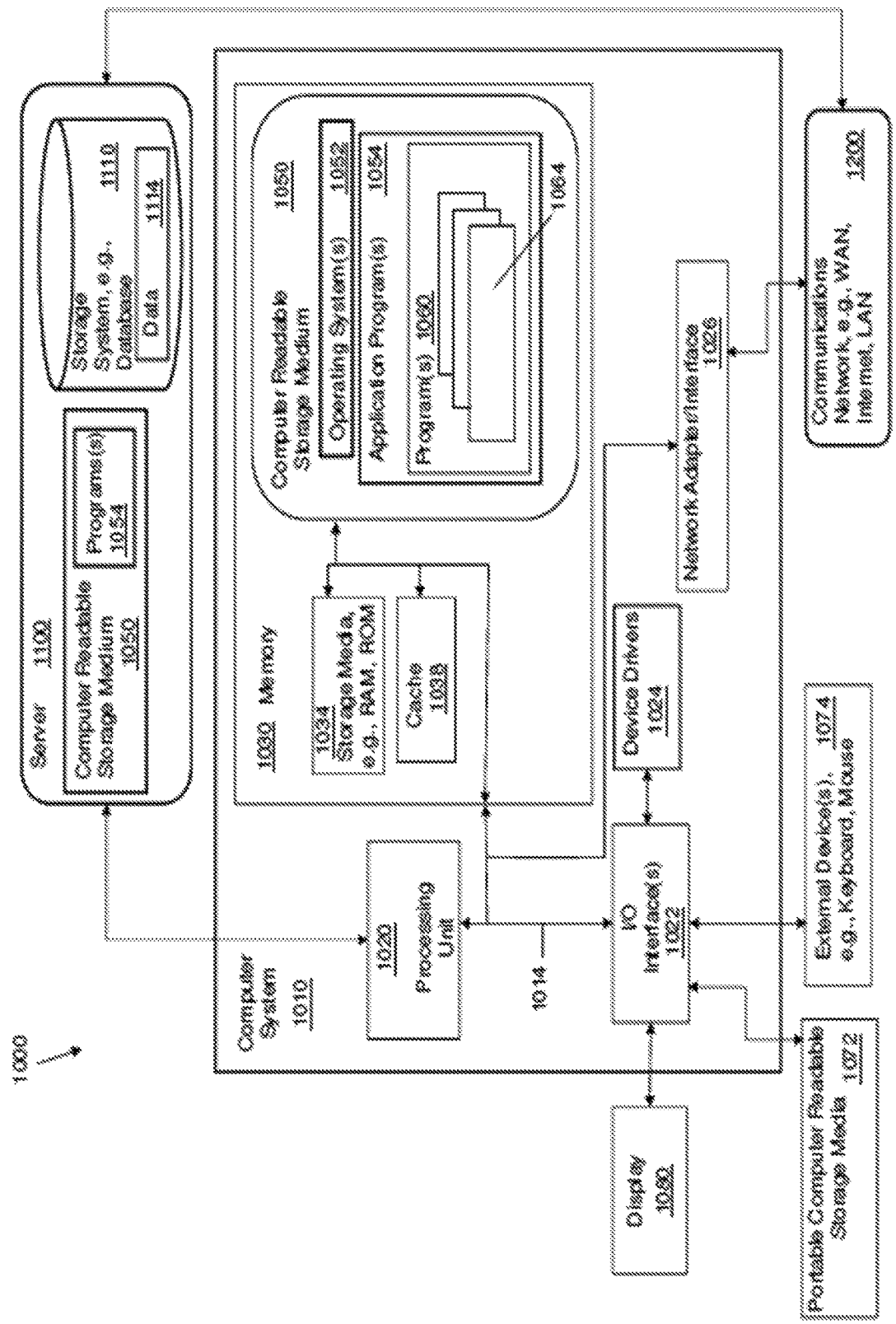
FIG. 3 is a block diagram depicting the hardware components of the image identification and classification system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 160-168 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
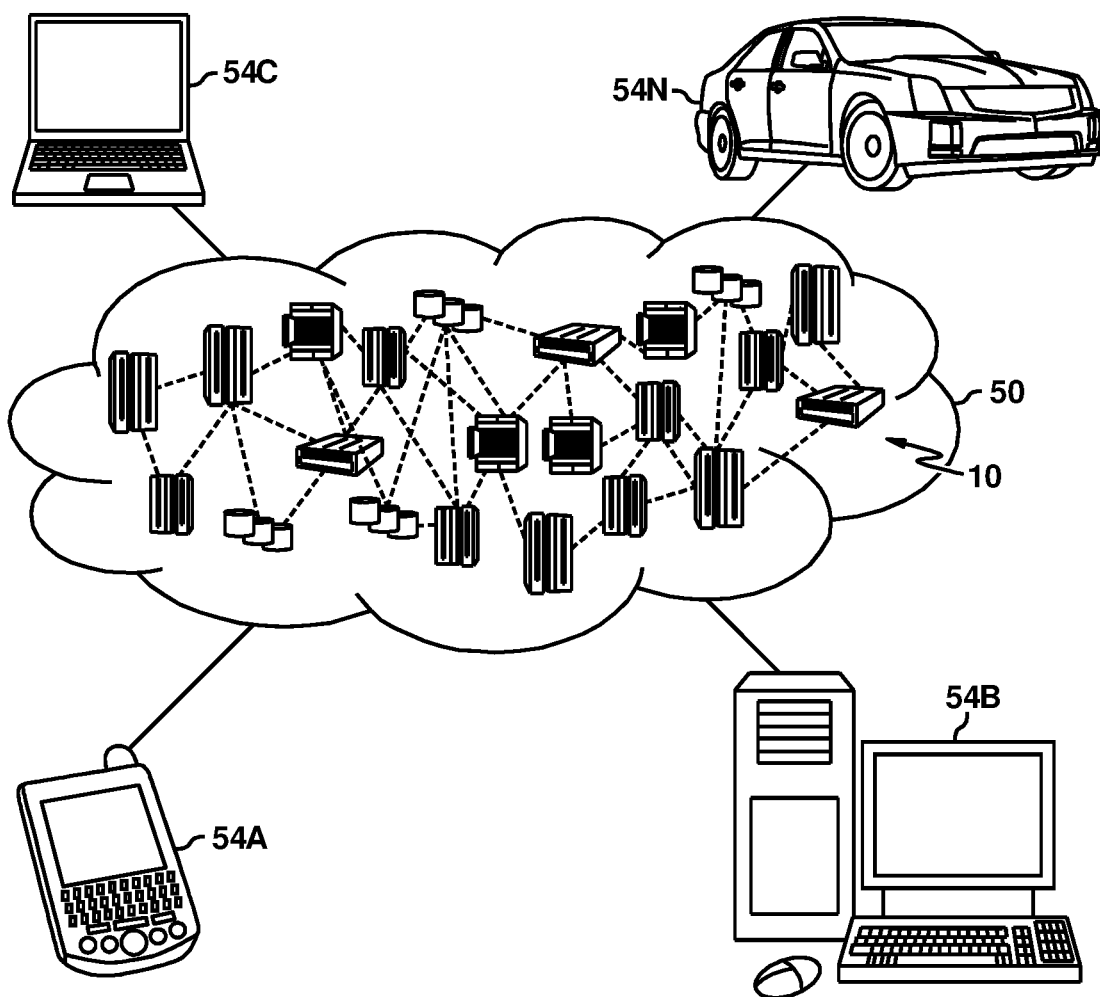
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
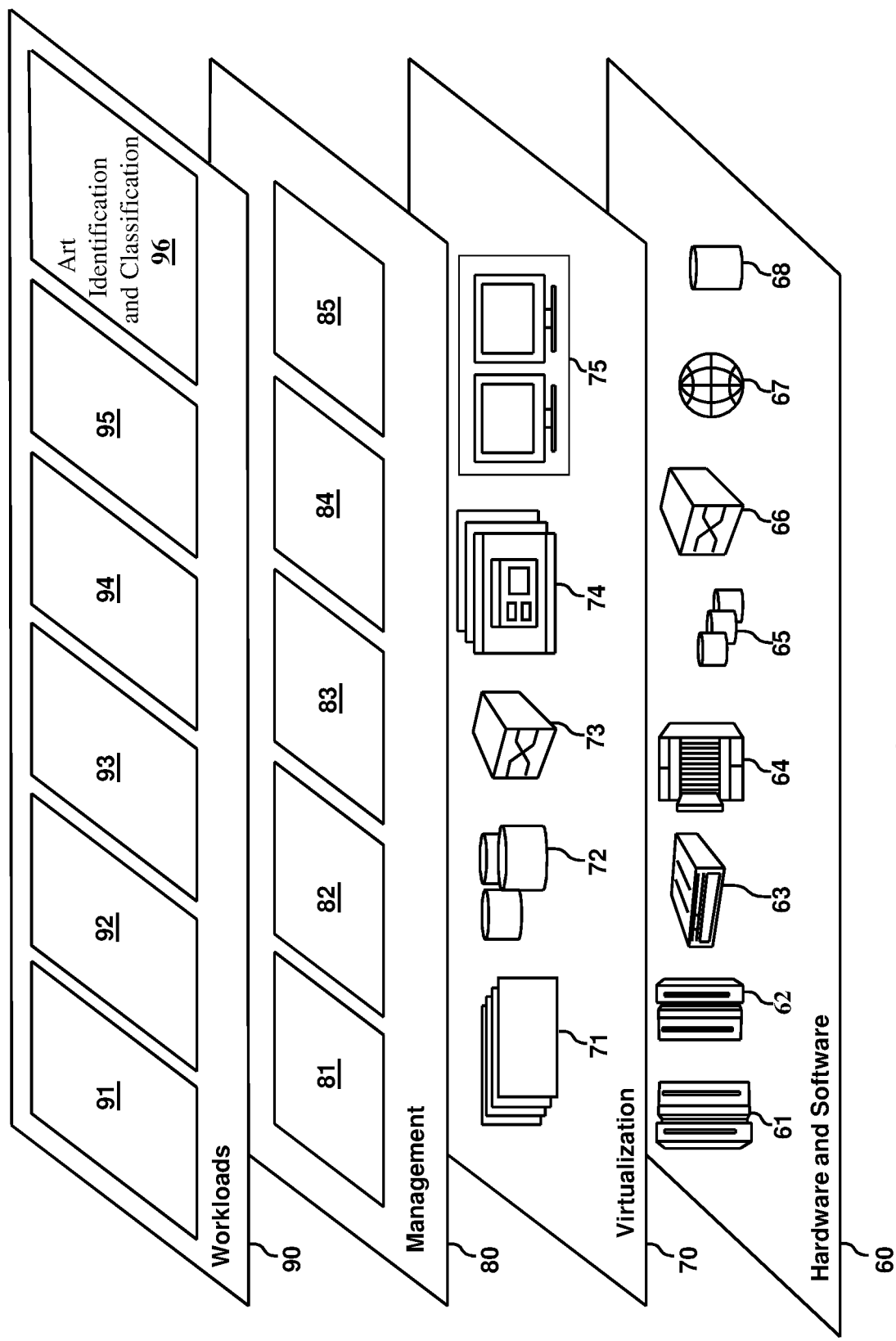
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image identification and classification 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for image identification and classification, the method comprising:
    receiving, by a computer device, one or more images of a first object from at least two angles;
    receiving, by the computing device, linguistic data associated with the first object, wherein the linguistic data of the first object describes the artist, art medium, age, color, symbol, pattern, function, and motif of the first object;
    inputting, by the computing device, the one or more images of the first object into one or more first neural networks;
    inputting, by the computing device, the linguistic data of the first object into one or more second neural networks;
    combining, by the computing device, an output of the one or more first neural networks and the one or more second neural networks;
    generating, by the computing device, an identification model based on the combined output of the one or more first neural networks and the one or more second neural networks, wherein the identification model generates a linguistic description for an unknown object;
    receiving, by the computer device, at least one image of an unknown second object, wherein the second object is the unknown object (multiple images from different angles);
    inputting, by the computer device, the at least one image of the unknown second object into the identification model to generate a linguistic description of the unknown second object;
    analyzing, by the computer device, the at least one image of the unknown second object to identify different features of the unknown second object;
    generating, by the computer device, a novel linguistic description identifying the unknown second object based on the identified different feature of the unknown second object, wherein the linguistic description includes a novel description of the unknown second object describing the unknown second object and the identified features of the unknown second object, wherein the generated linguistic description is based on a probability distribution of generating a word given previous linguistic data on the second neural networks and the one or more images on the first neural networks; and
    displaying, by the computer device, the novel linguistic description identifying the unknown second object to a user.

2. A method as in claim 1, wherein the first object is a known piece of art.

3. A method as in claim 1, wherein the one or more first neural networks are deep convolutional neural networks.

4. A method as in claim 1, wherein the one or more second neural networks are deep recurrent neural networks.

5. A method as in claim 1, wherein the first object and the second object may comprise one of the group consisting of: a painting, a mural, graffiti, a drawing, a photograph, a tapestry, a stained glass, a glasswork piece, a metalwork piece, a sculpture, a pottery piece, a porcelain piece, a ceramic piece, jewelry, clothing, furniture, and architecture.

6. A computer program product for image identification and classification, the computer program product comprising:
    a computer-readable storage medium having program instructions embodied therewith, wherein the computer readable storage medium is not a transitory signal per se, the program instructions comprising:
    program instructions to receive, by a computer device, one or more images of a first object from at least two angles;
    program instructions to receive, by the computing device, linguistic data associated with the first object, wherein the linguistic data of the first object describes the artist, art medium, age, color, symbol, pattern, function, and motif of the first object:
    program instructions to input, by the computing device, the one or more images of the first object into one or more first neural networks;
    program instructions to input, by the computing device, the linguistic data of the first object into one or more second neural networks;
    program instructions to combine, by the computing device, an output of the one or more first neural networks and the one or more second neural networks;
    program instructions to generate, by the computing device, an identification model based on the combined output of the one or more first neural networks and the one or more second neural networks, wherein the identification model generates a linguistic description for an unknown object;

program instructions to receive, by the computer device, at least one image of an unknown second object, wherein the second object is the unknown object (multiple images from different angles);

program instructions to input, by the computer device, the at least one image of the unknown second object into the identification model to generate a linguistic description of the unknown second object;

program instructions to analyze, by the computer device, the at least one image of the unknown second object to identify different features of the unknown second object;

program instructions to generate, by the computer device, a novel linguistic description identifying the unknown second object based on the identified different feature of the unknown second object, wherein the linguistic description includes a novel description of the unknown second object describing the unknown second object and the identified features of the unknown second object, wherein the generated linguistic description is based on a probability distribution of generating a word given previous linguistic data on the second neural networks and the one or more images on the first neural networks; and program instructions to display by the computer device the novel linguistic description identifying the unknown second object to a user.

7. A computer program product as in claim 6, wherein the first object is a known piece of art.

8. A computer program product as in claim 6, wherein the one or more first neural networks are deep convolutional neural networks.

9. A computer program product as in claim 6, wherein the one or more second neural networks are deep recurrent neural networks.

10. A computer system for image identification and classification, the system comprising:

one or more computer processors, one or more computer-readable storage media, and program instructions stored on one or more of the computer-readable storage media for execution by at least one of the one or more processors, the program instructions comprising:

program instructions to receive, by a computer device, one or more images of a first object from at least two angles;

program instructions to receive, by the computing device, linguistic data associated with the first object;

program instructions to input, by the computing device, the one or more images of the first object into one or more first neural networks;

program instructions to input, by the computing device, the linguistic data of the first object into one or more second neural networks, wherein the linguistic data of the first object describes the artist, art medium, age, color, symbol, pattern, function, and motif of the first object;

program instructions to combine, by the computing device, an output of the one or more first neural networks and the one or more second neural networks;

program instructions to generate, by the computing device, an identification model based on the combined output of the one or more first neural networks and the one or more second neural networks, wherein the identification model generates a linguistic description for an unknown object;

program instructions to receive, by the computer device, at least one image of an unknown second object wherein the second object is the unknown object (multiple images from different angles);

program instructions to input, by the computer device, the at least one image of the unknown second object into the identification model to generate a linguistic description of the unknown second object;

program instructions to analyze, by the computer device, the at least one image of the unknown second object to identify different features of the unknown second object;

program instructions to generate, by the computer device, a novel linguistic description identifying the unknown second object based on the identified different feature of the unknown second object, wherein the linguistic description includes a novel description of the unknown second object describing the unknown second object and the identified features of the unknown second object, wherein the generated linguistic description is based on a probability distribution of generating a word given previous linguistic data on the second neural networks and the one or more images on the first neural networks; and program instructions to display, by the computer device, the novel linguistic description identifying the unknown second object to a user.

11. A computer system as in claim 10, wherein the first object is a known piece of art.

12. A computer system as in claim 10, wherein the one or more first neural networks are deep convolutional neural networks.

13. A computer system as in claim 10, wherein the one or more second neural networks are deep recurrent neural networks.

* * * * *